(12) United States Patent
Kobayashi (10) Patent No.: US 7,058,882 B2
(45) Date of Patent: Jun. 6, 2006

(54) AUDIO DATA RECORDING/REPRODUCING APPARATUS AND METHOD

(75) Inventor: Hironari Kobayashi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 615 days.

(21) Appl. No.: 09/976,818

(22) Filed: Oct. 12, 2001

(65) Prior Publication Data
US 2002/0045962 A1    Apr. 18, 2002

(30) Foreign Application Priority Data
Oct. 18, 2000    (JP)    ............................. 2000-317728

(51) Int. Cl.
*G06K 9/36* (2006.01)

(52) U.S. Cl. .................. 715/500.1; 381/119; 381/150; 381/61; 84/604

(58) Field of Classification Search ................ 345/328; 360/13; 386/95; 84/605, 604; 369/83; 715/723, 715/501.1, 500; 381/119
See application file for complete search history.

(56) References Cited

U.S. PATENT DOCUMENTS

| 5,321,198 | A | | 6/1994 | Suzuki et al. | |
|---|---|---|---|---|---|
| 5,894,306 | A | * | 4/1999 | Ichimura | .................... 345/418 |
| 6,097,557 | A | * | 8/2000 | Inoue et al. | ................... 360/13 |
| 6,166,731 | A | * | 12/2000 | Duvall et al. | ............... 715/723 |
| 6,181,870 | B1 | | 1/2001 | Okada et al. | |
| 6,857,130 | B1 | * | 2/2005 | Srikantan et al. | ............. 725/93 |

FOREIGN PATENT DOCUMENTS

| JP | 8185675 | 7/1996 |
|---|---|---|
| JP | 8315551 | 11/1996 |
| JP | 11187354 | 7/1999 |

OTHER PUBLICATIONS

D. Anderson, R. Doris, J. Moorer, A distributed computer system for professional audio, 1994, ACM Press, pp. 373-379.*

* cited by examiner

*Primary Examiner*—Heather R. Herndon
*Assistant Examiner*—Gautam Sain
(74) *Attorney, Agent, or Firm*—Morrison & Foerster LLP (57) ABSTRACT

Each track is made up of a linkage of regions, and each of the regions is made up of a linkage of nodes or clusters. Sound data are stored on a cluster-by-cluster basis, and reproduced by tracing such linkages. Each time editing is performed on a virtual track of the track, a track data of a corresponding leading region in the edited virtual track is stored in memory as a history record of the track. When an undoing instruction is given, desired record data is selected from the history records of the leading region. Where the sound data in the trailing-end cluster of a preceding region and leading-end cluster of a succeeding region amount to less than 50% of a predetermined total data quantity of sound data to be contained in a proper cluster, the sound data represented by a trailing-end offset and the sound data represented by a leading-end offset are combined together and then written into a reproducing cluster. In reproduction, the sound data written in the reproducing cluster are reproduced for a connecting portion between the preceding and succeeding regions.

17 Claims, 6 Drawing Sheets

AUDIO DATA RECORDING/REPRODUCING APPARATUS AND METHOD

BACKGROUND OF THE INVENTION

The present invention relates to audio data recording/reproducing apparatus and methods which store audio data in an external storage device, such as a hard disk device, and edit and reproduce the thus-stored audio data.

In digital audio recorders including digital mixing recorders, which use an external storage device such as a hard disk device, a file of song management data is created for each song (which is one complete unit of music to be recorded or reproduced and corresponds, for example, to a single piece of music), so as to manage sound data (waveform data) stored in the external storage device. The song management data for each song include various information necessary for reproducing the song, which includes data indicative of recorded locations (clusters), on the external storage device, of a series of the song-constituting sound data.

In such digital audio recorders, the external storage device includes a song-management-data storing address area, and a sound-data storing address area. In the song-management-data storing address area, there are stored song management data for individual songs. In the sound data storing address area, sound data of individual takes—each take corresponds to recording on one occasion—are stored on a cluster-by-cluster basis. Same sound data may be used more than once in one song or may be shared among a plurality of songs.

When reproduction of a given song is instructed, access is made to particular addresses in the song-management-data storing address area where are stored the song management data of the given song, so as to read out the song management data. Then, on the basis of the read-out song management data, access is made sequentially to particular clusters where are stored the sound data of the given song, to thereby reproduce the given song.

Each song is made up of a plurality of tracks, and each of the tracks is made up of a plurality of regions. Each of the regions is in turn composed of a linkage of a plurality of nodes corresponding to clusters. Editing can be performed on each of these hierarchical levels, song, track and region. Through punch-in (and punch-out) operations, new sound data can be recorded additively into a desired section of a music piece, and a section of the same music piece can be copied and pasted to a desired section of the music piece.

During editing, it has been conventional to preserve history records of individual editing operations performed in such a manner that the editing can be undone later. Thus, management for keeping the records of the editing operations tends to be very complicated and laborious, and the management would impose heavy burdens on software used.

Further, the punch-in, short-time recording, editing of the regions, etc. would produce a sound-data-deficient cluster among a succession of clusters which is reproducible only for a limited portion thereof. Because such a sound-data-deficient cluster is reproduced in a very short time, preparations for reproducing the next cluster can not be appropriately made in time during reproduction of the successive clusters, which would prevent stable sound data reproduction.

SUMMARY OF THE INVENTION

In view of the foregoing, it is an object of the present invention to provide an improved audio data recording/reproducing apparatus and method which allow once-made editing to be undone without requiring complicated and troublesome data management and which permits stable sound data reproduction even when there has been produced a cluster reproducible only for a limited portion thereof.

In order to accomplish the above-mentioned object, the present invention provides an audio data recording/reproducing apparatus capable of editing audio data made up of a plurality of tracks, which comprises: a first storage device that stores audio data, the audio data stored in the first storage device being managed dividedly as one or more partial audio data; a second storage device that stores track data for each of a plurality of tracks, the track data for each of the tracks including information for associating at least one of the partial audio data, stored in the first storage device, with the track and information for managing a manner of reproducing the partial audio data associated with the track; and a processor coupled with the first storage device and the second storage device. The processor in this audio data recording/reproducing apparatus is adapted to: perform an editing operation for editing the track data for a desired one of the tracks, in accordance with an editing instruction; and perform control to store the edited track data for the desired track in the second storage device while preserving the track data before the editing.

The present invention is characterized by storing not only the edited track data (i.e., track data after having undergone the editing) but also the track data before undergoing the editing (i.e., before-editing track data). Thus, when an undoing instruction is given, for example, it is only necessary to read out the preserved before-editing track data, so that the present invention can eliminate a need for complicated and troublesome data management and can significantly alleviate the burdens on the software used.

According to another aspect of the present invention, there is provided an audio data recording/reproducing apparatus which comprises: a first storage device randomly accessible on a cluster-by-cluster basis, audio data being stored dividedly across a plurality of clusters in such a manner that the audio data amounting to a first data quantity or less than the first quantity are stored in each of the clusters; a second storage device that stores track data indicating reproduction order of a plurality of clusters to be sequentially reproduced and a particular quantity of audio data to be reproduced for at least one of the plurality of clusters; and a processor coupled with the first storage device and the second storage device. The processor in this audio data recording/reproducing apparatus is adapted to: when the particular quantity of audio data indicated by the track data is less than a second data quantity in at least one of the clusters, combine the audio data of the one cluster with the audio data of another cluster that precedes or follows the one cluster in the reproduction order; and preserve the combined audio data in a reproducing cluster separate from the at least one cluster. Here, the second data quantity is smaller than the first data quantity.

Even when there has been produced a sound-data-deficient cluster which contains only a small quantity of audio data to be reproduced short of or less than the first data quantity, i.e. which is reproducible only for a limited portion thereof, the present invention combines the small quantity of audio data in the cluster with audio data of another cluster linked with the sound-deficient cluster so as to meet the predetermined data quantity requirement, through the use of the reproducing cluster. Because preparations for a next cluster can be made appropriately during reproduction of such a reproducing cluster, the present invention provides for stable audio data reproduction.

The present invention also provides an audio data recording/reproducing apparatus which comprises: a first storage device randomly accessible on a cluster-by-cluster basis, audio data being stored dividedly across a plurality of clusters in such a manner that the audio data amounting to a first data quantity or less than the first quantity are stored in each of the clusters; a second storage device that stores track data indicating reproduction order of a plurality of clusters to be sequentially reproduced and a particular quantity of audio data to be reproduced for at least one of the plurality of clusters; and a processor coupled with the first storage device and the second storage device. The processor in this audio data recording/reproducing apparatus is adapted to: read out and reproduce the audio data of the clusters from the first storage device, in accordance with the track data stored in the second storage device and in the reproduction order indicated by the track data; and when a reproducing cluster is prepared for a particular one of the plurality of clusters represented by the reproduction order and when the particular cluster is to be reproduced during reproduction of the plurality of clusters in the reproduction order, read out and reproduce the audio data from the reproducing cluster rather than from the particular cluster.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the embodiments to be described herein represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its embodiments will be described in greater detail hereinbelow with reference to the accompanying drawings, in which.

DETAILED DESCRIPTION OF EMBODIMENTS

Figure 1:
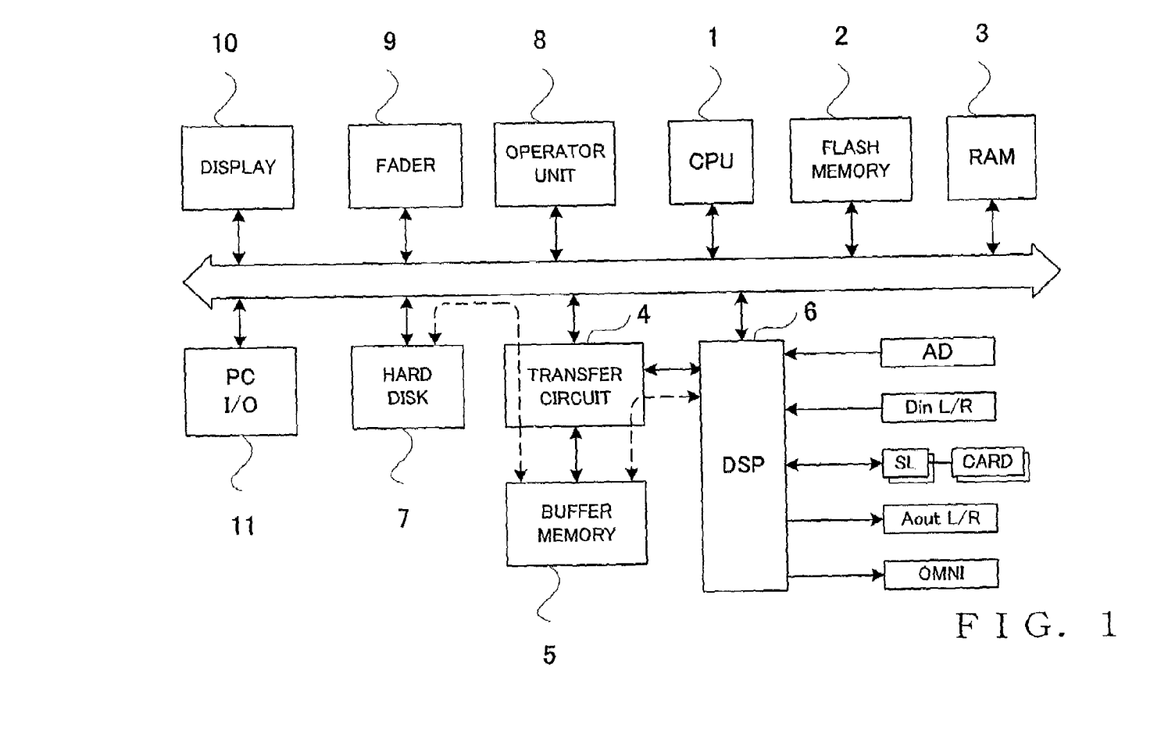
FIG. 1 is a block diagram showing an exemplary general setup of a hard disk recorder in accordance with an embodiment of the present invention.

FIG. 1 is a block diagram showing an exemplary general setup of a digital mixing recorder (hard disk recorder) constructed as an embodiment of an audio data recording/reproducing apparatus in accordance with the present invention. The digital mixing recorder (hard disk recorder) of FIG. 1 includes a CPU 1, a flash memory 2, a RAM 3, a transfer circuit 4, a buffer memory 5, a DSP (Digital Signal Processor) 6, a hard disk 7, an operator unit 8, a fader 9, a display device 10, and a PC input/output (I/O) circuit 11.

The CPU 1 controls entire operation of the digital mixing recorder on the basis of programs stored in the flash memory 2, using a working area of the RAM 3. Specifically, the CPU 1 outputs instructions to the transfer circuit 4 and DSP 6 and performs song recording/reproduction control, mixing control and the like using the hard disk 7. Also, the CPU 1 performs editing of a song, track, region, waveform and the like, on the basis of information indicative of operational states of the hard disk 7 and fader 9. Further, the CPU 1 controls display by the display device 10 and operation of the motor driven fader 9. Furthermore, the CPU 1 communicates with another computer to supply and receive song data and the like to and from the other computer, via the PC input/output (I/O) circuit 11.

The DSP 6 includes an analog input terminal (AD) equipped with an analog-to-digital converter (A/D converter) for receiving and converting an audio signal into a digital signal, a digital input terminal (Din L/R) for receiving a digital signal, slots (SL) to which can be connected option cards (CARD), such as an analog-to-digital conversion card, digital-to-analog conversion card and digital I/O card, analog output terminal (Aout L/R) equipped with a digital-to-analog converter (D/A converter) for converting a digital signal into an analog signal, and a multipurpose analog output terminal (OMNI) also equipped with a digital-to-analog converter for converting a digital signal into an analog signal and usable for a variety of purposes. In accordance with an instruction given from the CPU 1, the DSP 6 performs, every predetermined sampling cycle, signal processing to process a plurality of digital signals input from the individual input terminals or from the transfer circuit 4 and a mixer process to selectively mixes the input signals, and outputs the resultant mixed digital signals to the respective output terminals or to the transfer circuit 4. Such digital signals will hereinafter be called sample data or sound data or audio data.

In accordance with an instruction from the CPU 1, the transfer circuit 4 carries out data transfer between the hard disk 7 and the buffer memory 5 and between the buffer memory 5 and the DSP 6. For example, when recording for one track is to be performed, the transfer circuit 4 receives one sample data from the DSP 6 and writes the received sample data into the buffer memory 5, every sampling cycle. Then, once one cluster of the sample data has been accumulated in the buffer memory 5, the transfer circuit 4 transfers the sample data to a storage region, allocated to the track, in the hard disk 7. Even during such data transfer from the DSP 6 to the hard disk 7, the transfer circuit 4 continues to receive the data from the DSP 6. In this way, the sound data are stored as data of the track in question.

Further, when reproduction for one track is to be performed, the transfer circuit 4 reads out, from the hard disk 7, the sample data (sound data) of first two or more clusters of the track in question and then writes them into the buffer memory 5. Next, every sampling cycle, the transfer circuit 4 reads out one sample data from the buffer memory 5 and transfers the read-out sample data to the DSP 6. Then, once there has been produced an empty region corresponding to one cluster in the buffer memory 5 (i.e., empty region from which the sample data of one cluster have been reproduced), the sample data of a next cluster are transferred from the hard disk 7 into the empty region, so that, every sampling cycle, the transfer circuit 4 reads out one sample data from the buffer memory 5 and transfers the read-out sample data to the DSP 6 as noted above.

Figure 2:
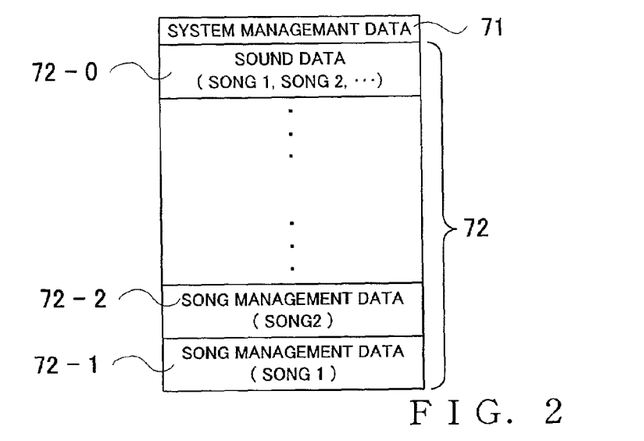
FIG. 2 is a diagram showing an exemplary manner in which a hard disk in the embodiment is divided into various address areas.

In FIG. 2, there is shown an exemplary manner in which the hard disk 7 is divided into various address areas. As shown, the hard disk 7 is divided into, in its start-to-end direction (top-to-bottom direction in the figure), a system-management-data storing address area 71 of a fixed storage capacity, and a shared address section 72 following the system-management-data storing address area 71 and lying up to the endmost of the hard disk 7. In the shared address section 72, channel-by-channel sound data are accumulatively recorded, sequentially in order of takes, as digital signals from the fore (top) end of the address section 72 so that a sound-data storing address area 72-0 is formed in a sequentially enlarged fashion. Song management data of individual songs are sequentially recorded from the rear (bottom) end of the shared address section 72 so that song-management-data storing address areas 72-1, 72-2, . . . are formed sequentially in corresponding relation to the songs.

The sound data are recorded on a cluster-by-cluster basis, namely, in clusters each having a size of 128K bytes. Each of the clusters holds 64K words (samples), which, in the case of data in the CD format (16 bits and 44.1 kHz), amount to data of 1.45 sec. (i.e., 64/44.1 kHz =1.45 sec.). Once recorded, the sound data will not be deleted unless an instruction for deleting the corresponding take is given.

The instant embodiment of the hard disk recorder is capable of simultaneously recording or reproducing (or recording and reproducing) a plurality of tracks. When a plurality of tracks are to be recorded, the transfer circuit 4 receives, every sampling cycle, a plurality of sample data of a plurality of tracks from the DSP 6 and then writes the received sample data into buffer storage regions, in the buffer memory 5, corresponding to the tracks. Whenever one cluster of the sample data has been accumulated in any one of the buffer storage regions corresponding to the tracks, the transfer circuit 4 writes the accumulated sample data into an unused cluster of the hard disk 7 as sound data of the track in question. Thus, the sound data of the plurality of tracks to be simultaneously recorded are mixedly stored, in clusters, into the shared address section 72 of the hard disk 7. Sound data to be added later by punch-in, punch-out or otherwise, waveform-edited sound data, or the like are recorded in the shared address section 72 apart from address locations where the sound data were recorded by initial recording on that track, and thus, the sound data of each of virtual tracks, provided primarily for editing purposes, are recorded in the shared address section 72 dispersedly or dividedly across a plurality of clusters.

The song management data are recorded sequentially from the rear (bottom) end address of the entire hard disk 7 on the song-by-song basis; however, it is to be noted that in each of the song-management-data storing address areas 72-1, 72-2, . . . , the song management data are recorded in a normal or positive direction, i.e. in an address-incrementing direction. Because each of the song-management-data storing address areas 72-1, 72-2, . . . has a fixed storage capacity, the respective start locations of the song-management-data storing address areas 72-1, 72-2, . . . can be arithmetically obtained by just previously recording, in the system-management-data storing address area 71, the endmost address of all the address areas in the entire hard disk 7.

According to the above-described file construction, access is automatically made to the first or leading address of the hard disk 7 to read out the system management data, as soon as the hard disk recorder is turned on. Then, when a particular song is designated, access is made, on the basis of the read-out system management data, to the song-management-data storing address area storing the song management data of the designated song, so as to read out the corresponding song management data. Further, when reproduction of the designated song is instructed, access is sequentially made, on the basis of the read-out song management data, to addresses storing the sound data for each currently-selected virtual track, so as to read out the sound data, so that the sound data of the virtual track can be reproduced.

Description is made here about examples of more specific contents and organizations of the above-mentioned system management data, sound data and song management data recorded on the hard disk 7. The system management data include information indicative of a total number of songs currently stored on the hard disk 7, empty (currently available) storage capacity and empty locations of the shared address section 72, start and end addresses of the shared address section 72, etc. The sound data include waveform data, name of the take to which the sound data belong, etc.

Figure 3:
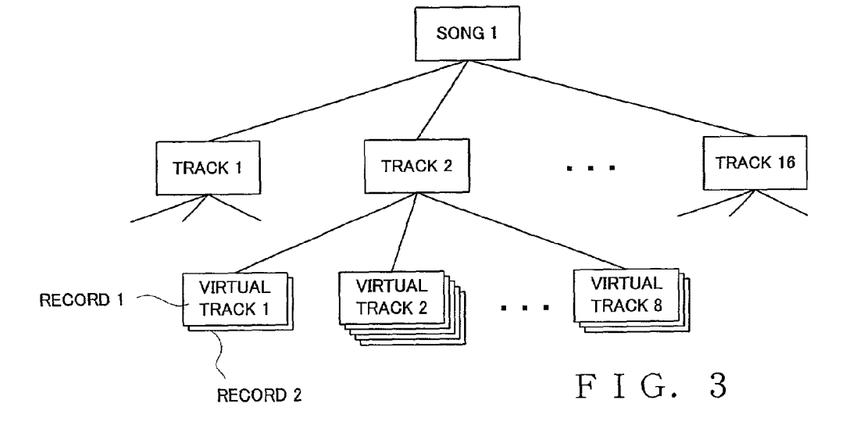
FIG. 3 is a diagram showing an exemplary hierarchical structure of a song in the embodiment.

FIG. 3 is a diagram showing an exemplary detailed hierarchical structure of a song employed in the instant embodiment. As shown, the song is made up of a plurality of tracks (e.g., 16 tracks), and each of the tracks includes eight virtual tracks (virtual track 1-virtual track 8). Each of the virtual tracks comprises a linkage of a plurality of regions. Whenever data editing is performed on any one of the regions, the edited data (after-editing data) of the region is stored in the virtual track, independently of the data of the region before undergoing the editing (before-editing data). Thus, as illustrated conceptually in piled blocks in FIG. 3, each of the virtual tracks includes data of the regions corresponding to a history record of editing so far made.

Figure 4:
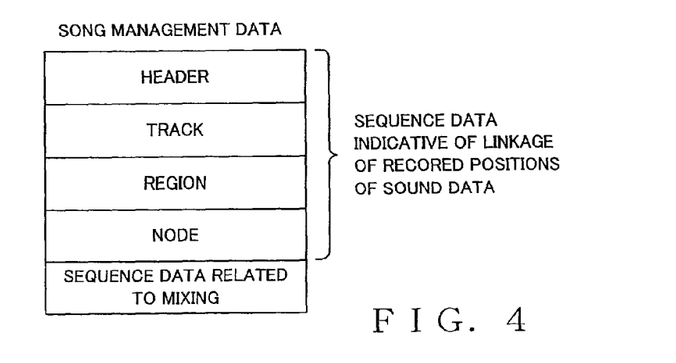
FIG. 4 is a diagram showing an exemplary format of song management data of a song in the embodiment.

In FIG. 4, there is shown an exemplary format of the song management data of a song employed in the instant embodiment. The song management data include sequence data indicative of a linkage among recorded positions of the sound data for each of the virtual tracks included in the song, and sequence data related to a mixing function. The sequence data indicative of the linkage among the recorded positions of the sound data have a hierarchical organization; that is, the sequence data include, in the top-to-bottom direction, a header portion, track portion, region portion and node portion.

The "header portion" contains information indicative of the name and date of creation of the song, virtual track number currently selected in each of the tracks in the song, etc. The "track portion" contains information indicative of the respective names of the individual tracks (16 tracks), history records of respective leading or first region numbers of the eight virtual tracks (or pointers to the respective leading region numbers), and pointer indicative of a currently-selected leading region number in the history record. Each time one of the tracks is edited, one history record is added to the history records of the leading region number.

The "region portion" contains information of the regions making up the virtual tracks. More specifically, the "region portion" contains, for each of the regions, a particular region number of another region that precedes the region in question (i.e., preceding region number) within the linkage, a particular region number of a next region that follows the region in question (i.e., next region number) within the linkage, performance start time of the region in question (i.e., relative time from a performance start time point of the song), a leading node number (or pointer to the leading node), a performance start point in the leading node, and a total time length of the performance (the number of the nodes and performance end point in the last node). Regarding the leading or first region of the track in question, the preceding region number is written as "NULL" because there is no preceding region. Similarly, regarding the last region of the track in question, the next region number is written as "NULL" because there is no succeeding region. Further, where a reproducing cluster (that will be described later) is provided, the "region portion" stores an immediately-preceding cluster number specifying a cluster immediately preceding the region in question, a leading-end offset to be described later, an immediately-following cluster number specifying a cluster immediately following the region in question, and a trailing-end offset to be also described later. Note that where no reproducing cluster is provided, each of the immediately-preceding cluster number and immediately-following cluster number is written as "NULL" and each of the end offsets is written as "ZERO". Performance start point in the leading node and performance end point in the last node correspond to data designating a particular quantity of sound data to be reproduced for at least one cluster.

Further, the "node portion" in the song management data contains information of a plurality of linked nodes making up the region, and each of the nodes represents one cluster of sound data. More specifically, the "node portion" contains, for each of the nodes, a preceding node number specifying a node that precedes the node in question within the linkage, a next node number specifying a node that follows the node in question within the linkage, a particular number of a next region that follows the region in question in the linkage, and an address (cluster number), on the hard disk 7, of the corresponding sound data. Note that each of the node numbers may be replaced with a pointer to the node. Regarding the leading node of the take in question, the preceding node number is written as "NULL" because there is no preceding node, and regarding the last node of the take in question, the next node number is written as "NULL" because there is no succeeding node.

Here, the history records of the leading region numbers in the "track portion" are stored in association with track data TR indexed by a song number, track number, virtual track number and history record number. The history record number is stored as the pointer indicative of the leading region number. For example, track data TR (1, 2, 1, 2) represents the data of "song 1", "track 2", "virtual track 1", "history record 2", as seen from FIG. 3. The data set of "history record 1" corresponds to track data TR (1, 2, 1, 1), and the data set of "history record 2" is obtained by editing "history record number 1" of the data of "history record 1" and then storing the thus-edited data of the leading region number in association with track data TR (1, 2, 1, 2). Thus, if an undoing instruction is given, the data set of the leading region number is selected on the basis of track data TR (1, 2, 1, 1) with history record number "2" restored to "1", and reproduction or the like of the data set of the leading region number can be carried out simply in conditions as established before the editing. Here, the "editing" includes at least one of operations, such as complete or partial cutting of a given region, copying or moving of the thus-cut region, insertion or addition of the cut region into another region and punch-in recording of the cut region.

In reproduction of a given track, the following operations take place. Namely, once a particular song is selected, all of the song management data of the selected song are read out from the corresponding song-management-data storing address area of the hard disk 7 and held in the RAM 3. Then, when reproduction of the song is instructed, the CPU 1 identifies, on the basis of the song management data held in the RAM 3, the virtual track selected for each of the tracks by reading the header portion, and the leading region number of the virtual track in question (normally the current virtual track of the greatest record number; however, one of the previous virtual tracks having the smallest record number may be designated as such a virtual track, by the undoing operation) by reading the track portion. Also, the CPU 1 identifies the leading node number of the region in question by reading the region portion, and identifies the cluster number of the node in question by reading the node portion. After that, the CPU 1 accesses the cluster of the identified cluster number on the hard disk 7 to read out the sound data stored therein, and once the performance start time indicated by the region arrives, the CPU 1 performs (i.e., reproduces) the read-out sound data.

Because the node includes information indicative of the next node number, the CPU 1 sequentially identifies the linked nodes and acquires the corresponding cluster numbers, so as to sequentially read out and reproduce the sound data of the cluster numbers from the hard disk 7. Thus, for each of the selected virtual tracks, the successive sound data included in one region are reproduced. When the next note number arrives at a node labeled "NULL", this means that the node is the last node in the region, so that the CPU 1 completes the reproduction of the region after having read out the sound data from the cluster number indicated by that node. After that, the CPU 1 identifies the next region number contained in the region whose reproduction has now been completed, and performs operations, similar to those mentioned above, on the next region; in this way, the successive sound data corresponding to the individual regions can be reproduced. In the case where the reproducing cluster is used as noted above, audio data in the reproducing cluster are reproduced for a connecting portion between adjacent regions.

In the above-described manner, the sound data constituting the selected virtual track are sequentially reproduced from the linkage of the regions and the linkage of the nodes contained in the individual regions. When the next region number arrives at a region labeled "NULL", this means that the region is the last region in the virtual track, so that the CPU 1 completes the reproduction after having read out the successive sound data contained in the last region.

Figure 5A:
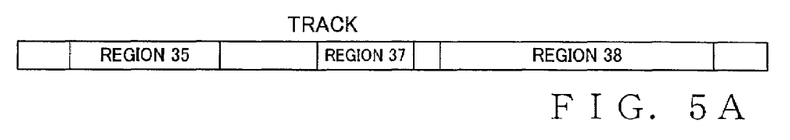
FIGS. 5A–5E are diagrams showing relationships among a track, regions and rows of nodes in the embodiment.

FIGS. 5A–5E show relationships among a track (virtual track), regions and rows of nodes (takes). As shown in FIG. 5A, the track is made up of a plurality of regions 35, 37 and 38. To reproduce the track in the illustrated example, the region 35 is first reproduced, then a silent state (substantial non-data-reproduced state) continues for a while, and then the region 37 is reproduced, after which the region 38 is reproduced following a short silent state. As seen in FIGS.

Figure 5B:
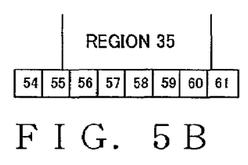
Figure 5C:
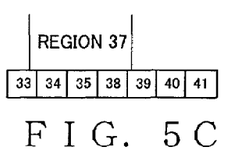
Figure 5D:
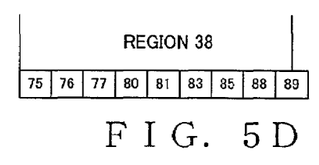
Figure 5E:
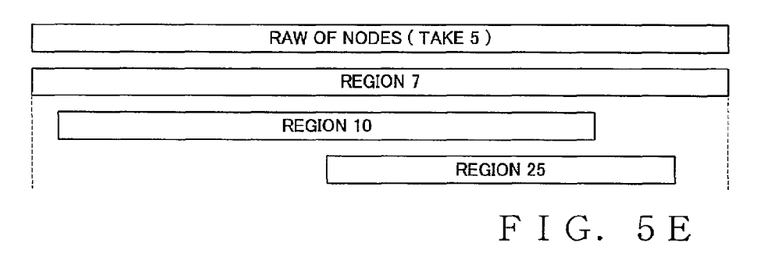

5B, 5C and 5D, each of the regions corresponds to a row (linkage) of a plurality of nodes; for example, the region 35 corresponds to a linkage of nodes 55–61, the region 37 corresponds to a linkage of nodes 33–39, and the region 38 corresponds to a linkage of nodes 75–89. In FIGS. 5B, 5C and 5D, vertical lines a performance start point and end point in each of the regions, from which it is seen that the start and end points of each of the regions ordinarily occur in intermediate portions of nodes (clusters). As further seen in FIG. 5E, a plurality of the regions (a plurality of the tracks) are set for each take (one recording) which corresponds to a row of successive nodes).

Figure 6:
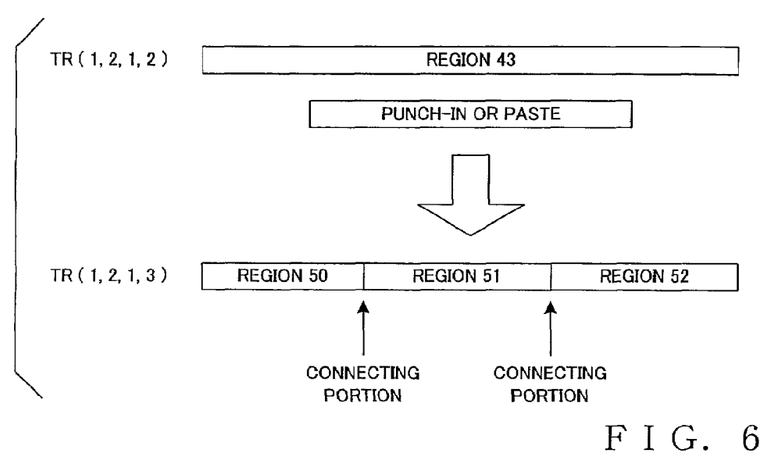
FIG. 6 is a diagram showing exemplary changes in record number and region number that result from editing in the embodiment.

While a blanks or silent state intervenes between the regions 35 and 37 and between the regions 37 and 38 in the illustrated example of FIG. 5A, a plurality of regions 50, 51 and 52 are sometimes connected in series as illustratively shown in FIG. 6, in which case the sound data may not be read out in time for the leading-end cluster in the connecting portion between the regions so that sound data reproduction can not be performed in a stable condition. Namely, if each of the clusters to be reproduced sequentially contains a sufficient quantity of sound data for a predetermined reproduction time, it is possible to make preparations for reproduction of the next cluster (i.e., transfer of the sound data from the hard disk 7 to the buffer memory 5); however, if any one of the clusters to be reproduced sequentially does not contain a sufficient quantity of sound data for a predetermined reproduction time, then preparations for reproduction of the next cluster can not be completed, which would result in unstable reproduction involving a break, jump, etc. in reproduced sounds. Such a cluster containing an insufficient quantity of sound data will be called a "sound-data-deficient cluster". FIG. 6 shows an example where a plurality of the serially-connected regions 50, 51 and 52 have been produced by an editing operation, such as punch-in recording during reproduction of a given region 43 or insertion of sound data, extracted from the same or other region, in an intermediate (en route) position of the region 43. Such editing is substantially equivalent to editing a linkage of a plurality of clusters including a sound-data-deficient cluster. The sound data set having undergone the editing is imparted with a new region number, and the fore (leading) portion of the original region 43 becomes the region 50, the inserted sound data set becomes the region 51 and the rear (trailing) portion of the original region 43 becomes the region 52. Assuming that the track including the original region 43 is represented by track data TR (1, 2, 1, 2) with the history record number set to "2", track data TR (1, 2, 1, 3) is created, at this point, for a track having a next history record number "3", and the regions 50, 51 and 52 are incorporated into that new virtual track.

Figure 7:
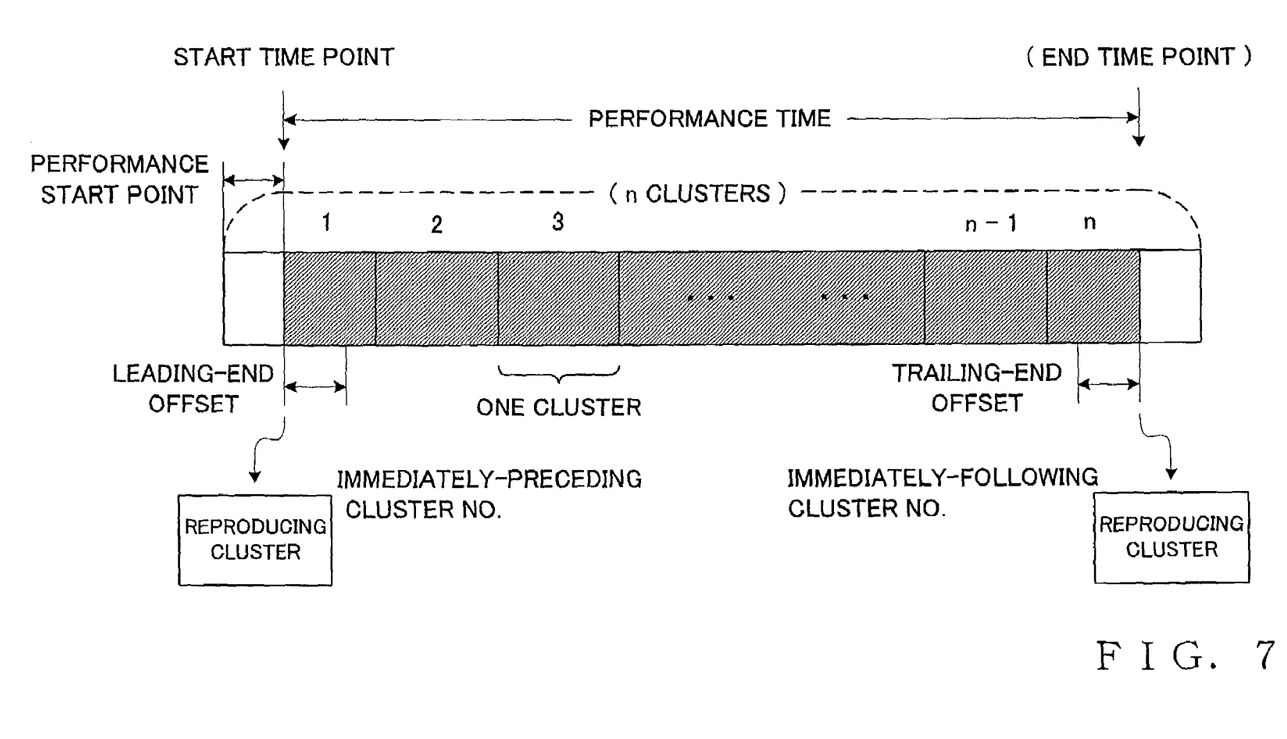
FIG. 7 is a diagram showing an exemplary data organization of the region and reproducing clusters.

FIG. 7 is a diagram showing an exemplary data organization (linkage of clusters) of the region and reproducing clusters. The reproducing clusters are stored in the hard disk 7 and used for stabilizing reproduction of a connecting portion between successive regions. In the illustrated example, n (n is an integral number more than one) clusters are linked together by the region, and the sound data located in a hatched portion are read out, cluster by cluster, from the hard disk 7 into the buffer memory 5 for the purpose of reproduction. In the cluster-by-cluster readout, a certain insufficient quantity of the sound data, less than a predetermined data quantity of sound data to be contained in a complete or proper cluster, are read out for each of the first (leading-end) and last (nth or trailing-end) clusters, although the predetermined data quantity of sound data are read out for the intervening clusters. If the data quantity of the sound data in a given cluster is considerably less than the predetermined data quantity, the sound data may not be reproduced appropriately, depending on the operating speed of the hard disk, processing capability of the CPU, etc., because these sound data read into the buffer memory 5 can be reproduced in a much shorter time and thus it is necessary to promptly start readout of the sound data of the following cluster.

Thus, in case editing or the like performed by the CPU 1 has produced, at the beginning or end of the region, a sound-data-deficient cluster having sound data less than the predetermined data quantity (in this case, 50% of the predetermined total data quantity of sound data to be contained in the proper cluster), the CPU 1 in the instant embodiment detects such a sound-data-deficient state after the editing process and creates a reproducing cluster. For example, the CPU 1 adds or combines together some or all of the sound data of the first cluster of the current region and some or all of the sound data of the last cluster of a preceding region in such a manner that the resultant sum of the sound data exceeds the predetermined data quantity, and then the CPU 1 writes the combined sound data into the reproducing cluster. Further, the CPU 1 combines together some or all of the sound data of the nth cluster of the current region and some or all of the sound data of the leading-end cluster of a next region in such a manner that the resultant sum of the sound data exceeds the predetermined data quantity, and then the CPU 1 writes the combined sound data into the reproducing cluster. Thus, the sound data of the reproducing cluster are reproduced for the connecting portion between the adjacent regions.

In the case where such a reproducing cluster is used, the immediately-preceding cluster number indicative of the preceding reproducing cluster and immediately-following cluster number indicative of the immediately-following reproducing cluster are stored as region data. Also, there are stored a leading-end offset indicative of the data quantity of the sound data to be recorded from the first cluster into the preceding reproducing cluster (i.e., data indicative of a use range of the sound data to be extracted from the first cluster), and a trailing-end offset indicative of the data quantity of the sound data to be recorded from the nth cluster into the succeeding reproducing cluster (i.e., data indicative of a use range of the sound data to be extracted from the nth cluster).

Figure 8A:
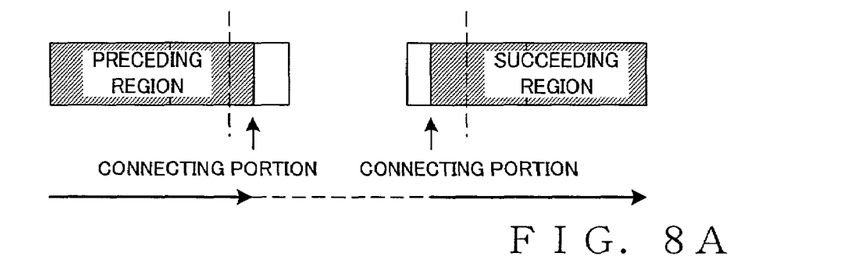
FIGS. 8A–8D are diagrams showing examples of processes where sound-data-deficient clusters of adjacent regions are interconnected by use of a reproducing cluster.

FIGS. 8A–8D and FIGS. 9A–9C show examples where, as a result of an editing operation for directly connecting a pair of preceding and succeeding regions, there has been produced a sound-data-deficient cluster in each of the regions and a reproducing cluster is provided as necessary. More specifically, FIG. 8A shows a case where the sound data in each of the trailing-end cluster of the region preceding the connecting portion (preceding region) and leading-end cluster of the region following the connecting portion (succeeding region) amount to more than 50% of the predetermined total data quantity of sound data to be contained in the proper cluster; vertical dotted lines in the figure each denote a position corresponding to 50% of the predetermined total data quantity. In this case, the preceding region and succeeding region are reproduced, just as they are, using no reproducing cluster. Thick horizontal arrows represent a progression of sound data reproduction, and more particularly indicate that the audio data in the preceding region are first reproduced up to the connecting portion and then the audio data in the succeeding region are reproduced immediately following the connecting portion.

Figure 8B:
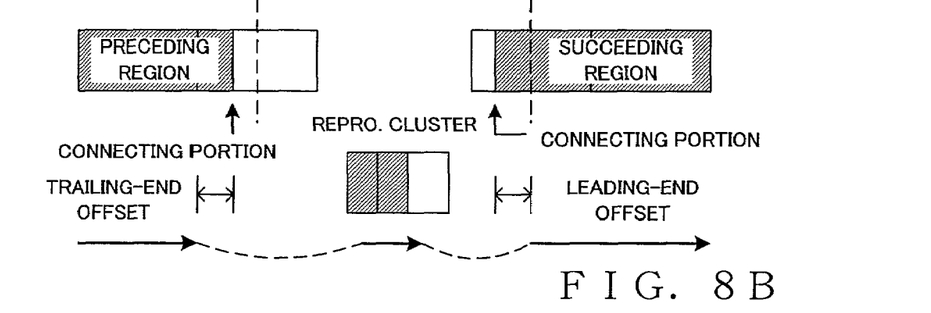

FIG. 8B shows another case where the sound data in at least one of the trailing-end cluster of the preceding region and leading-end cluster of the succeeding region amount to less than 50% of the predetermined total data quantity of sound data to be contained in the proper cluster, and where the combination or sum of the sound data in the trailing-end cluster of the preceding region and leading-end cluster of the succeeding region is more than 100% of the predetermined total data quantity. In this case, the sound data in the trailing-end cluster of the amount to less than 50% of the predetermined total data quantity, and all the sound data in the trailing-end cluster of the preceding region corresponds to a trailing-end offset. Further, the sound data in a fore end portion of the leading-end cluster of the succeeding region corresponds to a leading-end offset such that the sound data amounting to 50% of the predetermined total data quantity are left in the latter half of the leading-end cluster of the succeeding region. The sound data represented by the trailing-end offset of the preceding region and the sound data represented by the leading-end offset of the succeeding region are combined together and then written into a reproducing cluster. In reproduction, the sound data of the preceding region are first reproduced up to the cluster immediately preceding the trailing-end cluster, then the sound data in the reproducing cluster are reproduced, and then the sound data of the succeeding region are reproduced starting with the remaining 50% sound data in the latter half of the leading-end cluster.

Note that a reproduction end point of the preceding region, at which the sound data reproduction shifts from the preceding region to the reproducing cluster, is determined here on the basis of the data in the trailing-end offset of the preceding region, and a reproduction start point of the succeeding region, at which the sound data reproduction shifts from the reproducing cluster to the succeeding cluster, is determined on the basis of the data in the leading-end offset of the succeeding region. Further, a reproduction end point of the reproducing cluster can be determined on the basis of the sum of the trailing-end offset and leading-end offset.

Figure 8C:
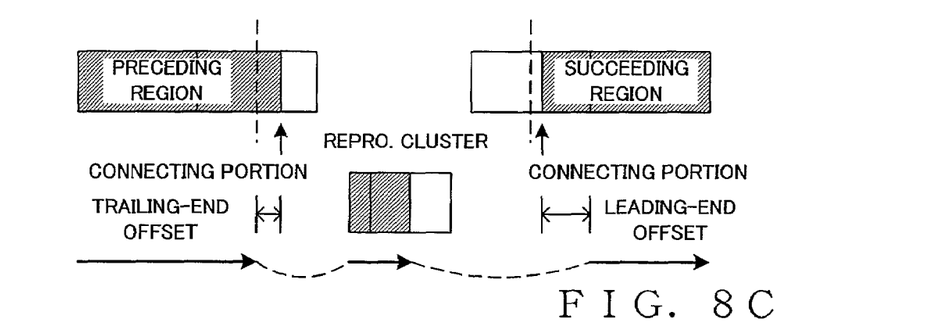

FIG. 8C shows still another case where the sound data in at least one of the trailing-end cluster of the preceding region and leading-end cluster of the succeeding region amount to less than 50% of the predetermined total data quantity, and where the sum of the sound data in the trailing-end cluster of the preceding region and leading-end cluster of the succeeding region is more than 100% of the predetermined total data quantity, similarly to FIG. 8B. In this case, the sound data in the leading-end cluster amount to less than 50% of the predetermined total data quantity. Further, the sound data in a rear end portion of the training-end cluster of the preceding region corresponds to a trailing-end offset such that the sound data amounting to 50% of the predetermined total data quantity are left in the former half of the trailing-end cluster. The sound data represented by the trailing-end offset and all the sound data in the leading-end cluster (leading-end offset) of the succeeding region are combined together and then written into a reproducing cluster. In reproduction, the 50% sound data in the trailing-end cluster of the preceding region are first reproduced, then the sound data in the reproducing cluster are reproduced, and then the sound data of the succeeding region are reproduced starting with the cluster immediately following the leading-end cluster.

Figure 8D:
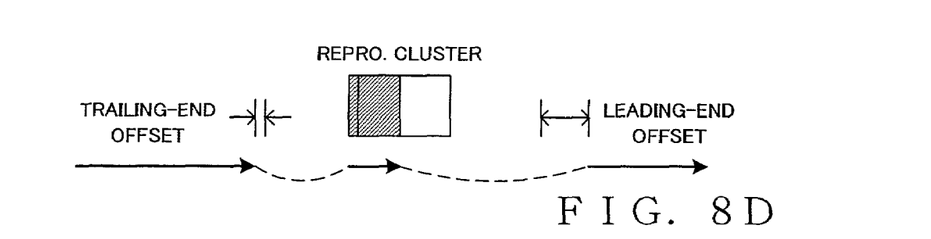

Whereas the sound data amounting to 50% of the predetermined total data quantity are left in the leading-end cluster of the succeeding region in the case of FIG. 8B and the sound data amounting to 50% of the predetermined total data quantity are left in the trailing-end cluster of the preceding region in the case of FIG. 8C so that the reproducing cluster in each of the cases takes in sound data amounting to more than 50% of the predetermined total data quantity), alternative arrangements may be made such that the reproducing cluster takes in sound data amounting to 50% of the predetermined total data quantity as illustratively shown in FIG. 8D.

Figure 9A:
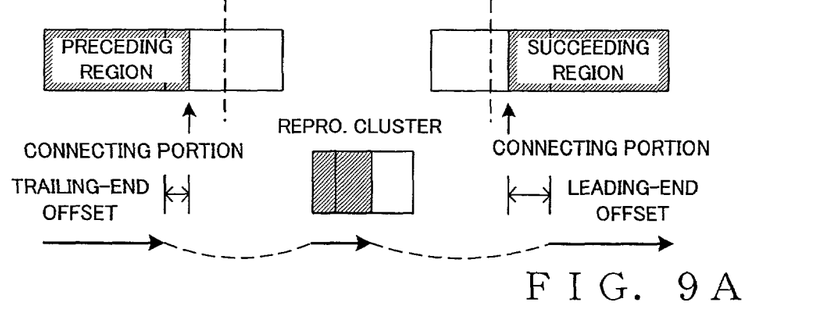
FIGS. 9A–9C are diagrams showing examples of processes where sound-data-deficient clusters of adjacent regions are interconnected by use of a reproducing cluster.

FIG. 9A shows still another case where the sound data in at least one of the trailing-end cluster of the preceding region and leading-end cluster of the succeeding region amount to less than 50% of the predetermined total data quantity of sound data to be contained in the proper cluster, and where the sum of the sound data in the trailing-end cluster of the preceding region and leading-end cluster of the succeeding region is more than 50% but less than 100% of the predetermined total data quantity. In this case, all the sound data in the trailing-end cluster (trailing-end offset) of the preceding region and all the sound data in the leading-end cluster (leading-end offset) of the succeeding region are combined together and then written into a reproducing cluster. In reproduction, the sound data in the cluster immediately preceding the trailing-end cluster of the preceding region are first reproduced, then the sound data in the reproducing cluster are reproduced, and then the sound data of the succeeding region are reproduced starting with the cluster immediately following the leading-end cluster.

Figure 9B:
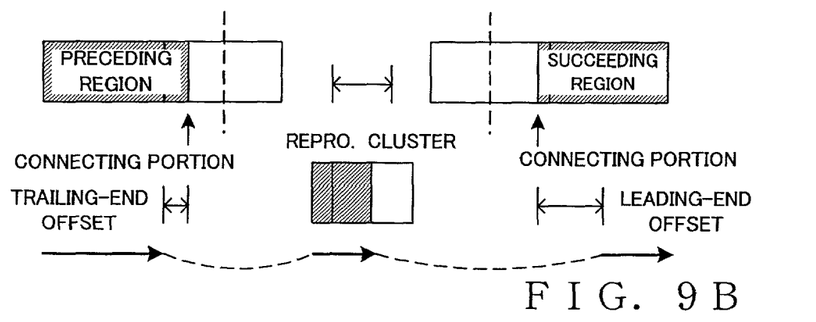
Figure 9C:
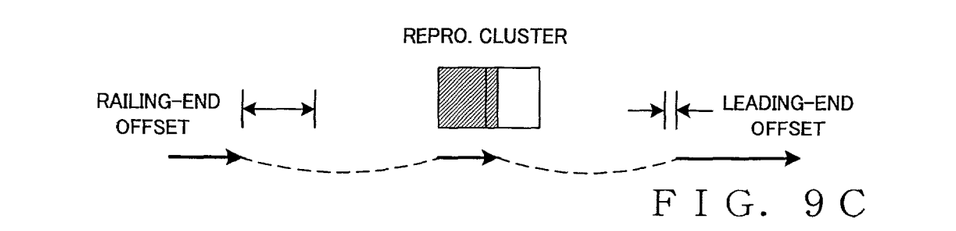

FIG. 9B shows still another case where the sound data in at least one of the trailing-end cluster of the preceding region and leading-end cluster of the succeeding region amount to less than 50% of the predetermined total data quantity of sound data to be contained in the proper cluster, and where the sum of the sound data in the trailing-end cluster of the preceding region and leading-end cluster of the succeeding region is still less than 50% of the predetermined total data quantity. In this case, all the sound data in the trailing-end cluster (trailing-end offset) of the preceding region, all the sound data in the leading-end cluster of the succeeding region, and a proportion of the sound data in the cluster immediately following the leading-end cluster of the succeeding region (leading-end offset) are combined together and then written into a reproducing cluster. In reproduction, the sound data in the cluster immediately preceding the trailing-end cluster of the preceding region are first reproduced, then the sound data in the reproducing cluster are reproduced, and then the sound data of the succeeding region are reproduced starting with the remaining sound data in the cluster immediately following the leading-end cluster (represented by the leading-end offset). In an alternative to this case, a proportion of the sound data in the cluster immediately preceding the trailing-end cluster of the preceding region and all the sound data in the trailing-end cluster of the preceding region (trailing-end offset) and all the sound data in the leading-end cluster (leading-end offset) of the succeeding region may be combined together and then written into the reproducing cluster, as illustratively shown in FIG. 9C.

It should be appreciated that whereas the above-described embodiment is arranged to control the data to be reproduced for each of the clusters to be at least more than 50% of the predetermined total data quantity of sound data to be contained in the proper cluster, the to-be-reproduced data quantity is not necessarily limited to 50%; the to-be-reproduced data quantity may be set to any other suitable value, such as more than 30% or more than 60%, depending on the operating speed of the hard disk 7, processing capability of the CPU 1, etc. For example, if the to-be-reproduced data quantity is set to more than 30% of the predetermined total data quantity of sound data to be contained in the proper cluster, different control may be performed for each of various cases: 1) case where the sound data in each of the trailing-end cluster of the preceding region and leading-end cluster of the succeeding region amount to more than 30% of the predetermined total data quantity; 2) case where the sound data in at least one of the trailing-end cluster of the preceding region and leading-end cluster of the succeeding region amount to less than 30% of the predetermined total data quantity, but the sum of these sound data is more than 100% of the predetermined total data quantity; 3) case where the sound data in at least one of the trailing-end cluster of the preceding region and leading-end cluster of the succeeding region amount to less than 30% of the predetermined total data quantity, but the sum of these sound data is more than 30% but less than 100% of the predetermined total data quantity; 4) case where the sound data in each of the trailing-end cluster of the preceding region and leading-end cluster of the succeeding region amount to less than 30% of the predetermined total data quantity and the sum of these sound data is still less than 30% of the predetermined total data quantity. Further, such a to-be-reproduced data quantity may be set manually by the user manipulating a predetermined operator, or may be set automatically by the CPU 1 in accordance with detection results of processing capabilities of the hardware components employed, such as the hard disk 5, transfer circuit 4 and CPU 1.

Whereas the embodiment of the invention has been described above as employing the hard disk 7 as the external storage device, any other suitable external device may be employed, such as an optical disk device or magneto-optic disk device. Furthermore, although the embodiment has been described above in relation to the case where the basic teachings of the present invention are applied to an audio-data recording/reproducing apparatus with the external storage device incorporated therein, the present invention may also be applied to any other type of audio-data recording/reproducing apparatus employing an external storage device provided outside the recording/reproducing apparatus. Moreover, although the embodiment has been described above in relation to the case where the basic teachings of the present invention are applied to a digital mixing recorder (hard disk recorder), the present invention may also be applied to digital recorders having no mixing function and recording/reproducing apparatus intended for handling any other type of audio data than the above-described.

Further, the manner in which the hard disk 7 is divided into various address areas may be other than that shown in FIG. 2. The address areas may be arranged in any desired order, and any other address areas than those shown in FIG. 2 may be provided in the hard disk 7.

Furthermore, although the above-described embodiment is arranged to combine some or all of the sound data of the nth cluster and some or all of the sound data of the leading-end cluster of the next region in such a manner that the resultant sum of these sound data exceeds the predetermined total data quantity to be contained in the proper cluster, the present invention is not so limited; for example, the sound data in the nth cluster and (n−1)th cluster may be combined together in such a manner that the resultant sum of these sound data exceeds the predetermined total data quantity, or the sound data in the first and second clusters may be combined in such a manner that the resultant sum of these sound data exceeds the predetermined total data quantity.

Furthermore, whereas the above-described embodiment is arranged to provide a reproducing cluster, as necessary, for a connecting portion provided to directly interconnect two adjacent regions, the present invention may be applied to a connecting portion between a given region and a silent (mute) section following the given region or between a given silent (mute) section and a region following the given silent section. In a case where a silent waveform is read out from the buffer memory 5 repetitively in a looped fashion without the sound data being transferred from the hard disk for the silent section, as disclosed in Japanese Patent Application No. 2000-024637 (corresponding to U.S. patent application Ser. No. 09/772,635) filed by the assignee of the instant application, the present application can also be applied as in the case where it is applied to a connecting portion between adjacent regions, provided that each loop of the silent section is associated with one cluster.

In summary, the present invention is characterized by preserving not only edited track data but also before-editing track data. Thus, when an undoing instruction is given, it is only necessary to read out the preserved before-editing track data, so that the present invention can eliminate a need for complicated and troublesome management and can significantly alleviate the burdens on the software used. Further, the present invention permits editing of reproduction timing of sound data within a cluster. Furthermore, even when there has been produced a sound-data-deficient cluster which contains only a small quantity of sound data to be reproduced, the present invention combines the small quantity of sound data in the cluster with sound data of another cluster linked with the sound-deficient cluster to meet the predetermined total data quantity requirement, through the use of a reproducing cluster. Because preparations for a next cluster can be made during reproduction of such a reproducing cluster, the present invention provides for stable audio data reproduction. In addition, the present invention can edit a linkage or linked state of a plurality of clusters including the sound-data-deficient cluster. Because the sound data in the reproducing cluster satisfies the predetermined total data quantity requirement, stable audio data reproduction can be performed.

What is claimed is:

1. An audio data recording/reproducing apparatus capable of editing audio data made up of a plurality of tracks comprising:

a first storage device that stores a plurality of sound data;

a second storage device that stores track data, comprising current track data and track history data, for each of a plurality of tracks, the track data for each of the tracks including first information for designating, as partial sound data to be reproduced in the track corresponding to the track data, at least one part of one sound data of said plurality of sound data stored in said first storage device, and second information for designating respective reproduction timing of the designated partial sound data;

a reproduction device that, in accordance with the current track data for each of the tracks stored in said second storage device, reads out and reproduces respective partial sound data designated by said first information of the current track data from said first storage device, at the respective reproduction timing designated by said second information of the current track data for the respective partial sound data; and a processor coupled with said first storage device and said second storage, device, said processor being adapted to:

perform an editing operation for editing the current track data for a desired one of the tracks, in accordance with an instruction for editing, to create new current track data;

perform control to store the edited new current track data for the desired track in said second storage device while leaving the current track data before the editing stored in said second storage device, as one of the track history data; and perform control to select, in accordance with an instruction for undoing, one of the track history data, as new current track data.

2. An audio data recording/reproducing apparatus comprising:

a first storage device randomly accessible on a cluster-by-cluster basis, audio data being stored dividedly across a plurality of clusters in such a manner that the audio data amounting to a first data quantity or less than said first quantity are stored in each of the clusters;

a second storage device that stores track data indicating reproduction order of a plurality of clusters to be sequentially reproduced and a particular quantity of audio data of at least one of the plurality of clusters to be reproduced during the sequential reproduction of the plurality of clusters based of the track data;

a reproduction device that, on the basis of the track data stored in said second storage device, reads out the clusters from said first storage device in the reproduction order indicated by the track data and reproduces respective audio data of the read out cluster sequentially; and a processor coupled with said first storage device and said second storage device, said processor being adapted to:

detect if the particular quantity of audio data of at least one of the clusters indicated by the track data is less than a second data quantity which is smaller than said first data quantity, combine the audio data of the one cluster with the audio data of another cluster that precedes or follows the one cluster in the reproduction order when the processor detects that the particular quantity of audio data of the one cluster is less than the second data quantity, to obtain combined audio data of which data quantity is equal to or more than said second data quantity; and store the combined audio data into a cluster for reproduction separate from the one cluster in said first storage device, and add information indicating the cluster for reproduction to the track data stored in said second device, so that the combined audio data stored in the cluster for reproduction is reproduced in place of the one cluster during the sequential reproduction of the plurality of clusters based on the track data.

3. An audio data recording/reproducing apparatus as claimed in claim 2 wherein said processor is further adapted to edit the track data stored in said second storage device, by changing the reproduction order, of the plurality of clusters and/or the particular quantity of said at least one of the plurality of clusters indicated by the track data, in accordance with an instruction for editing.

4. An audio data recording/reproducing apparatus comprising:

a first storage device randomly accessible on a cluster-by-cluster basis, audio data being stored dividedly across a plurality of clusters in such a manner that the audio data amounting to a first data quantity or less than said first quantity are stored in each of the clusters;

a second storage device that stores track data indicating reproduction order of a plurality of clusters to be sequentially reproduced and a particular quantity of audio data of at least one of the plurality of clusters to be reproduced during the sequential reproduction of the plurality of clusters based on the track data, wherein, for at least one particular cluster of which the particular quantity is less than a second data quantity which is smaller than said first data quantity, combined audio data obtained by combining the audio data of the particular cluster with the audio data of another cluster that precedes or follows the particular cluster in the reproduction order is stored in a cluster for reproduction in said first storage device, and information indicating the cluster for reproduction is added to the track data stored in second storage device; and a reproduction device that reads out and reproduces the audio data of the clusters from said first storage device, in accordance with the track data stored in said second storage device and in the reproduction order indicated by the track data, wherein when the particular cluster is to be reproduced during reproduction of the plurality of clusters in the reproduction order, said reproduction device reads out and reproduces the audio data from the cluster for reproduction indicated by the information added to the track rather than from the particular cluster.

5. An audio data recording/reproducing apparatus as claimed in claim 4 which further comprises an editing device that edits any one of the plurality of clusters represented by the reproduction order, said plurality of clusters including the particular cluster.

6. An audio data recording/reproducing method, executed in an audio data recording/reproducing apparatus having a first storage device that stores a plurality of sound data, a second storage device that stores track data, comprising current track data and track history data for each of a plurality of tracks, the track data for each of the tracks including first information for designating, as partial sound data to be reproduced in the track corresponding to the track data, at least one part of one sound data of said plurality of sound data stored in said first storage device, and second information for designating respective reproduction timing of the designated partial sound data, and a reproduction device that, in accordance with the current track data for each of the tracks stored in said second storage device, reads out and reproduces respective partial sound data designated by said first information of the current track data from said first storage device, at the respective reproduction timing designated by said second information of the current track data for the respective partial sound data, said apparatus capable of editing audio data made up of a plurality of tracks, said method comprising:

a step of editing the current track data for a desired one of the tracks, in accordance with an instruction for editing, to create new current track data; and a step of performing control to store the edited new current track data for the desired track in said second storage device while leaving the current track data before the editing stored in said second storage device, as one of the track history data; and a step of performing control to select, in accordance with an instruction for undoing, one of the track history data, as new current track data.

7. A computer program comprising computer program code means for performing all the steps of claim 6 when said program is run on a computer.

8. An audio data recording/reproducing method, executed in an audio data recording/reproducing apparatus having a first storage device randomly accessible on a cluster-by-cluster basis, audio data being stored dividedly across a plurality of clusters in such a manner that the audio data amounting to a first data quantity or less than said first quantity stored in each of the clusters, a second storage device that stores track data indicating reproduction order of a plurality of clusters to be sequentially reproduced and a particular quantity of audio data of at least one of the plurality of clusters to be reproduced during the sequential reproduction of the plurality of clusters based on the track data, and a reproduction device that, on the basis of the track data stored in said second storage device, reads out the clusters from said first storage device in the reproduction order indicated by the track data and reproduces respective audio data of the read out cluster sequentially, said audio data recording/reproducing method comprising:

a step of detecting if the particular quantity of audio data of at least one of clusters indicated by the track data is less than a second data quantity which is smaller than said first data quantity;

a step of, when said step of detecting detects the particular quantity of audio data of the one cluster is less than the second data quantity, combining the audio data of the one cluster with the audio data of another cluster that precedes or follows the one cluster in the reproduction order to obtain combined audio data of which data quantity is equal to or more than said second data quantity; and a step of storing the combined audio data into a cluster for reproduction separate from the one cluster in said first storage device, and adding information indicating the cluster for reproduction to the track data stored in said second storage device, so that the combined audio data stored in the cluster for reproduction is reproduced in place of the one cluster during the sequential reproduction of the plurality of clusters based on the track data.

9. A computer program comprising computer program code means for performing all the steps of claim 8 when said program is run on a computer.

10. An audio data recording/reproducing method as claimed in claim 8, which further comprises a step of editing the track data stored in said second storage device, by changing the reproduction order of the plurality of clusters and/or the particular quantity of said at least one of the plurality of clusters indicated by the track data, in accordance with an instruction for editing.

11. An audio data recoding/reproducing apparatus capable of editing audio data made up of a plurality of tracks comprising:

a sound data storage device that stores a plurality of sound data;

a track data storage device that stores track data, comprising current track data and track history data, for each of a plurality of tracks, the track data for each of the tracks including first information for designating, as partial sound data to be reproduced in the track corresponding to the track data, at least one part of one sound data of said plurality of sound data stored in said first storage device, and second information for designating respective reproduction timing of the designated partial sound data;

a track editing device that edits current track data for any desired one of the tracks stored in said track data storage device, in accordance with an instruction for editing, and then stores the edited current track data, as new current track data for the desired track in said track data storage device, while leaving the current track data before the editing stored in said track data storage device, as one of the track history data;

a track reproduction device that, in accordance with the current track data for each of the tracks stored in said track data storage device, reads out and reproduces respective partial sound data designated by said first information of the current track data from said sound data storage device, at the respective reproduction timing designated by said second information of the current track data for the respective partial sound data;

a control device that performs control to select, in accordance with an instruction for undoing, one of the track history data stored in said track data storage device, as new current track data.

12. An audio data recording/reproducing apparatus as claimed in claim 11, wherein said first information designates respective extraction regions of one or more partial sound data which should be extracted, as partial sound data to be reproduced in the track corresponding to the track data, from said plurality of sound data stored in said sound data storage device.

13. An audio data recording/reproducing apparatus as claimed in claim 12, wherein said track editing device edits current track data in such a manner that at least one of partial sound data of said current track data is modified or deleted or new partial sound data is added to said current track data.

14. An audio data recording/reproducing apparatus as claimed in claim 11, wherein said reproduction timing is represented by relative time from a performance start time point of said audio data.

15. An audio data recording/reproducing apparatus as claimed in claim 11, wherein said track editing device edits current track data for said desired one of the tracks by changing, adding, or deleting at least one partial sound data to/from the desired track.

16. An audio data recording/reproducing apparatus comprising:

a first storage device randomly accessible on a cluster-by-cluster basis, audio data being stored dividedly across a plurality of clusters in such a manner that the audio data amounting to a first data quantity or less than said first quantity are stored in each of the clusters;

a second storage device that stores track data indicating reproduction order of a plurality of clusters to be sequentially reproduced and a particular quantity of audio data of at least one of the plurality of clusters to be reproduced during the sequential reproduction of the plurality of clusters based on the track data;

a reproduction device that, on the basis of the track data stored in said second storage device, reads out the clusters from said first storage device in the reproduction order indicated by the track data and reproduces respective audio data of the read out cluster sequentially;

a detecting device that detects if the particular quantity of audio data of at least one of the clusters indicated by the track data is less than a second data quantity which is smaller than said first data quantity, a combining device that, when the processor that detects the particular quantity of audio data is less than the second data quantity, combines the audio data of the one cluster with the audio data of another cluster that precedes or follows the one cluster in the reproduction order to obtain combined audio data of which data quantity is equal to or more than said second data quantity; and a control device that performs a control to store the combined audio data into a cluster for reproduction separate from the one cluster in said first storage device, and add information indicating the cluster for reproduction to the track data stored in said second storage device, so that the combined audio data stored in the cluster for reproduction is reproduced in place of the one cluster during the sequential reproduction of the plurality of clusters based on the track data.

17. An audio data recording/reproducing apparatus as claimed in claim 16, which further comprises an editing device that edits the track data stored in said second storage device, by changing the reproduction order of the plurality of clusters and/or the particular quantity of said at least one of the plurality of clusters indicated by the track data, in accordance with an instruction for editing.

* * * * *